June 13, 1950 S. A. STOLBERG 2,511,604

REPEAT DEVICE FOR AUTOMATIC PHONOGRAPHS

Original Filed July 30, 1945 3 Sheets-Sheet 1

INVENTOR.
Sven A. Stolberg,
BY
Atty.

June 13, 1950 S. A. STOLBERG 2,511,604

REPEAT DEVICE FOR AUTOMATIC PHONOGRAPHS

Original Filed July 30, 1945 3 Sheets-Sheet 2

INVENTOR.
Sven A. Stolberg,
BY
Atty.

REPEAT DEVICE FOR AUTOMATIC PHONOGRAPHS

Original Filed July 30, 1945 3 Sheets-Sheet 3

INVENTOR.
Sven A. Stolberg,
BY
Tho. Q. Raining Jr.
Atty.

Patented June 13, 1950

2,511,604

UNITED STATES PATENT OFFICE 2,511,604

REPEAT DEVICE FOR AUTOMATIC PHONOGRAPHS

Sven A. Stolberg, Chicago, Ill., assignor, by mesne assignments, to Raytheon Manufacturing Company, Newton, Mass., a corporation of Delaware Original application July 30, 1945, Serial No. 607,878. Divided and this application August 6, 1945, Serial No. 609,101

4 Claims. (Cl. 274—10)

This invention relates to repeat devices for record-changers, and the like. These record-changers are intended to play conventional disk type records, and are so devised that when each record has been played the device will or may automatically operate to deliver a new or unplayed record into playing position, and to shift the tone-arm back and forth as well as raising and lowering said tone-arm in correct manner to bring the stylus into engagement with the beginning of the sound track of such new record. These and other operations are performed in proper sequence and automatically by the mechanisms provided for such purposes in the normal functioning of the device. There arise times, however, when it is desired to re-play or repeat a given record already in playing position. When such "repeating" is desired the mechanism should be so functioned that various of the normal operations, such as tone-arm shifting back to the beginning of the sound track, and lowering of the stylus into engagement with the sound track, will be performed in proper sequence and automatically, at least as far as such sequence is concerned; but the record feeding mechanism by which the new record is supplied in playing position should be so conditioned that it will not then function, but will remain inoperative during the cycle of movements between the first playing of the record and the re-playing thereof.

It is a prime object of the present invention to provide means whereby such "repeating" action will be ensured, under control of the operator, when the repeat device is placed in its repeating position, but whereby when the repeating device is in its non-operative position the releasing action will be produced normally, a new record being introduced into playing position at the proper stage of the cycle of operations.

Specifically, the present repeating device is usable in connection with that type of record-changer in which the unplayed records are strung onto the upper portion of a center post and above the turntable, and above any previous records supported on said turn table, such unplayed records being themselves supported by a shoulder formed on the center post. By proper lateral shift of the lowermost of such unplayed records a slight amount, it is disengaged from such shoulder and permitted to descend to playing position. These arrangements are also such that only the lowermost one of the unplayed records is thus released, those records above such lowermost record being prevented from shifting laterally during the record releasing operation. Devices of this general type are well known in the present art, and I mention them as examples of means for delivering or permitting delivery of records to playing position, and in connection with which the devices of the present application are usable.

The foregoing general type of record feeding device is also usually associated with means to support the lateral or edge portions of the unplayed records in such elevated position, such edge supporting means functioning in conjunction with the shoulder support for the central portions of the records. When such edge support is provided the lateral shifting means for releasing the lowermost record into playing position may well be associated with such edge supporting means. Said lateral shifting means may take the form of reciprocable means adapted to press against the edge of the lowermost unplayed record, shifting said record sufficiently to ensure proper release of such record.

In my co-pending application for patent on improvements in Record-changing phonographs and the like, Serial No. 576,202, filed February 5, 1945, and assigned to the same assignee as the present application, I have disclosed a releasing mechanism operating on the general lines above explained, said releasing mechanism there takes the general form of a rock arm pivotally mounted within a stand provided on the edge portion of the supporting table, and having the upper portion of this rock-arm in position to engage the edge of the lowermost record when such rock is retracted or moved to its outward position (away from the center post); said upper portion of such rock arm serving to afterwards press the edge portion of the record inwardly towards the centerpost and thus cause record release at the proper time in the cycle of operations. Furthermore, in that application I have provided a spring or yieldable connection to said rock arm from the actuating device, so that in normal conditions, when a record is to be released, such spring will transmit operating force to the rock arm and cause it to rock in releasing direction. However, by blocking such rock arm in case it is desired to produce a "repeating" operation, the operating devices may function at their intended times, but the rock arm will not function, the spring or other yieldable connection yielding at such time to permit such "repeating" operation to occur. The blocking device disclosed in that application to produce such repeating operation is located directly in the stand wherein or whereon the rock arm is also carried. Said blocking device also comprises, in that application, a rock element journalled directly in the stand and co-operating with the rock arm to block such rock arm when repeating is desired, and permitting said rock arm to rock free of such blocking element when normal releasing function is to be permitted.

In my co-pending application for Repeat device for automatic phonographs, Serial No. 589,756, filed April 23, 1945, and assigned to the same assignee as the present application, now Patent No. 2,473,829, granted June 21, 1949, I have disclosed an improved form of such blocking means. In this case, also, however, such blocking means is carried directly by or on or in the stand whereby said rock arm is carried; and in this case said blocking means operates directly on the upper end portion of the rock arm whereby the record is released, and said blocking element in this case is carried by the rock arm itself and rocks back and forth with said rock arm.

The blocking means disclosed in said first mentioned application, Serial No. 576,202, is carried by or mounted on or in the stand wherein the rock arm is pivoted, but said blocking means functions directly on the rock arm itself to produce the blocking effect, such action being produced by extending said blocking element through an opening in the rock arm.

The present application discloses a blocking element for blocking the rocking of the rock arm for repeat purposes, which element is carried by or on the table which carries the principal operating devices of the record-changer, said blocking element acting directly on the lower end portion of such rock arm. In this application, also, I have herein disclosed a remote control for said blocking element, so that the same may be shifted between its blocking and non-blocking positions from a remote position, away from the stand whereon said rock arm is pivoted, such remote control device being located at a position where it is convenient for manipulation by the operator, and near the front of the table.

Said remote control device is also so formed that when it is moved to the "repeating" position, it is self locking, so that it cannot become unintentionally moved back to its non-blocking position; but such return to non-blocking position will readily occur by proper manipulation of the remote control itself.

A further feature of the present application relates to provision of a manual or supplemental means to rock the rock arm of the record-feeding or releasing mechanisms so as to make possible a manual release of the lowermost record. In this connection I have provided a supplemental actuating element whereby the rock arm may be rocked in the record releasing direction, and I have provided a manual control element for shifting such actuating element in the record releasing direction. Normally this supplemental actuating element stands in a non-actuating position, but by shifting it momentarily in the record releasing direction it serves to rock the rock arm, thereby releasing a record. Another shifting of this actuating element will release a further record, and thus the records may be manually released one at a time by this supplemental actuating element, said element being moved back to its normal or non-releasing position after each record releasing operation.

Specifically, the present application discloses an actuating element which, when shifted in one direction, serves to block the rocking movement of the rock arm, thereby ensuring a "repeat" operation; and which, when shifted in the opposite direction, serves to effect release of the lowermost record, and irrespective of any necessary actuation of the usual actuating element.

The devices herein disclosed are also disclosed in a copending application for improvements in Record-changers, Serial No. 607,878, filed July 30, 1945, and of which application the present application is a division.

Other objects and uses of the invention will appear from a detailed description of the same, which consists in the features of construction and combinations of parts hereinafter described and claimed.

Figure 1:
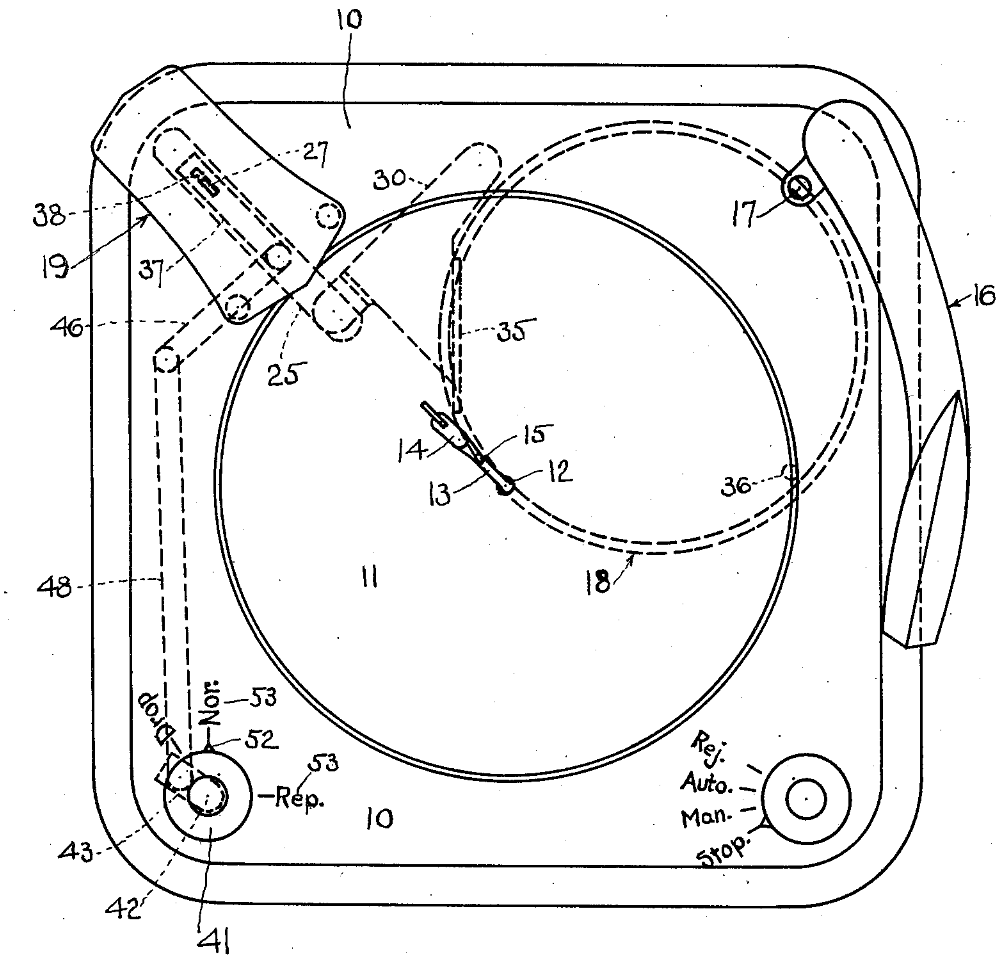
Figure 1 shows a plan view of a typical record-changer embodying the features of the present invention, certain of the "repeat" devices which are below the table being shown in dotted lines to show the manner in which they are related to the turntable and to other elements of the structure.

In Figure 1 I have shown more or less schematically a record-changer embodying the repeat device of the present invention. In Figure 1 the record-changer is shown as provided with the table 10 on which the principal elements of the device are mounted. These elements include the turntable 11, pivoted for rotation about the vertical axis 12. The centerpost 13 is provided to receive the records. This centerpost as shown is formed with its upper portion 14 bent laterally and slanting down to the shoulder 15 which is located a distance above the turntable sufficient to accommodate a number of records in playing position, the top record of which series is the one which is to be played. The unplayed records have their central portions supported by the shoulder 15, and by a slight lateral deflection of the lowermost unplayed record that record is released from the shoulder and allowed to descend into playing position. Arrangements of this kind are well known and understood in the present art.

The tone-arm 16 is journalled to rock on the vertical pivot 17 provided by a stand carried by the table 10. Said tone-arm may be rocked outwardly to the position shown in Figure 1 where said tone-arm is clear of records on the turntable, and said tone-arm may also rock inwardly as the record is played until the inner or terminal end of the sound track is reached. Thereupon means are provided for driving a one-cycle cam 18 through a single revolution, during which revolution said cam serves to raise the tone-arm from the record face, rock said tone-arm outwardly to its extreme position as shown in Figure 1, release a new record for descent to playing position, and swing the tone-arm inwardly to position above the outer or beginning end of the sound track of such so-lowered record, and then lower the tone-arm to bring the stylus into engagement with the sound track of the record. Thereafter the playing of such new record commences and proceeds to conclusion, whereupon the cycle is repeated.

Figures 2, 3, 4:
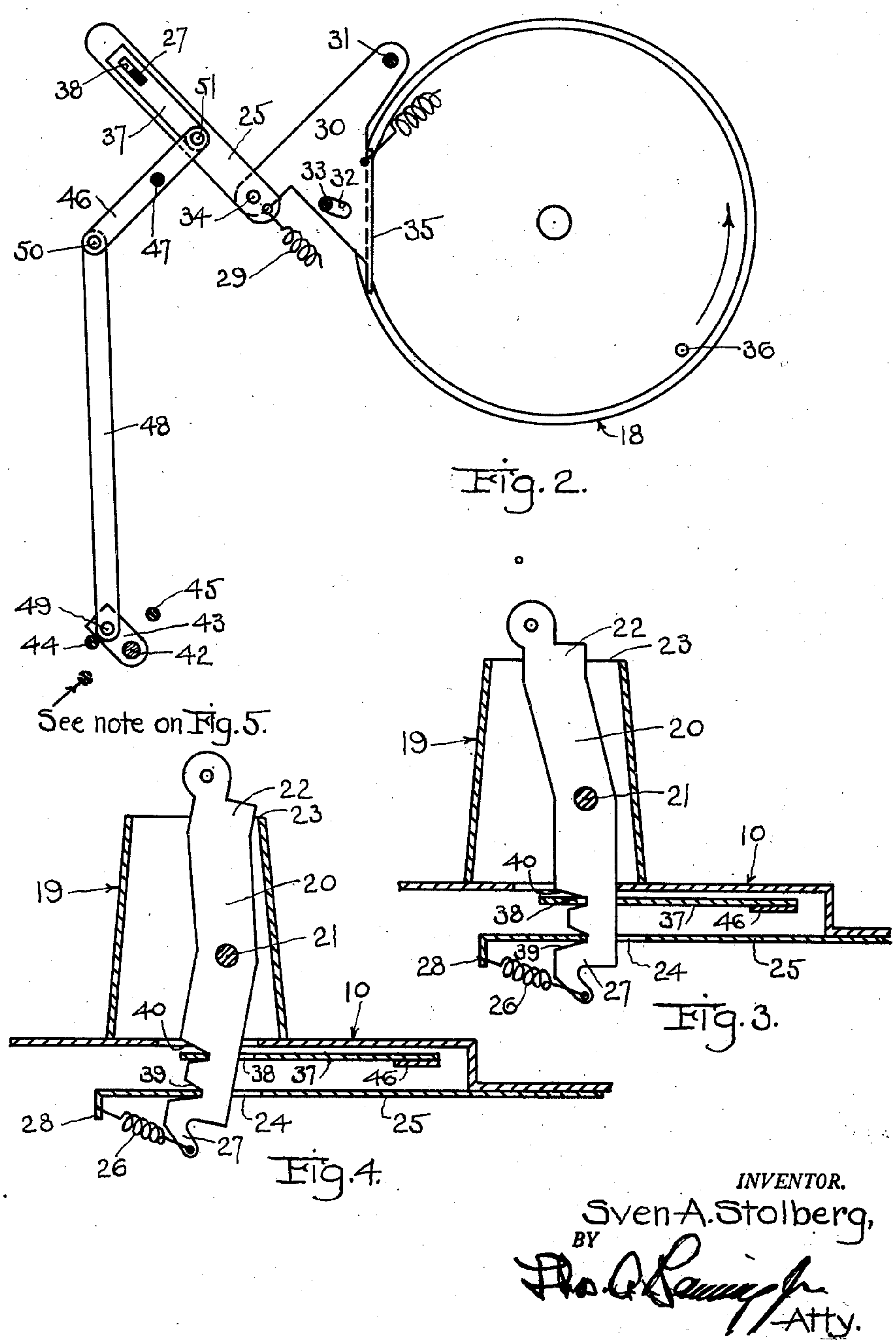
Figure 2 shows schematically the principal operating parts of the repeat mechanism proper, together with the outlines of the one-cycle cam, and it shows the remote control in connection with the blocking element; and in this figure the parts are shown with the remote control button in its normal or non-interfering position.
Figure 3 shows a vertical section through a typical stand which is mounted on the table, the rock arm being rockingly mounted in said stand; and in this figure the reciprocable bar which normally permits the rock arm to function, and controls such functioning, is in its non-reciprocated position, and the blocking bar is also in its non-blocking position.
Figure 4 shows a view similar to that of Figure 3, but with the reciprocable bar in its reciprocated position wherein it permits the rock arm to rock for a record releasing operation, the blocking bar being still in its non-blocking position.
Figures 5, 6, 7:
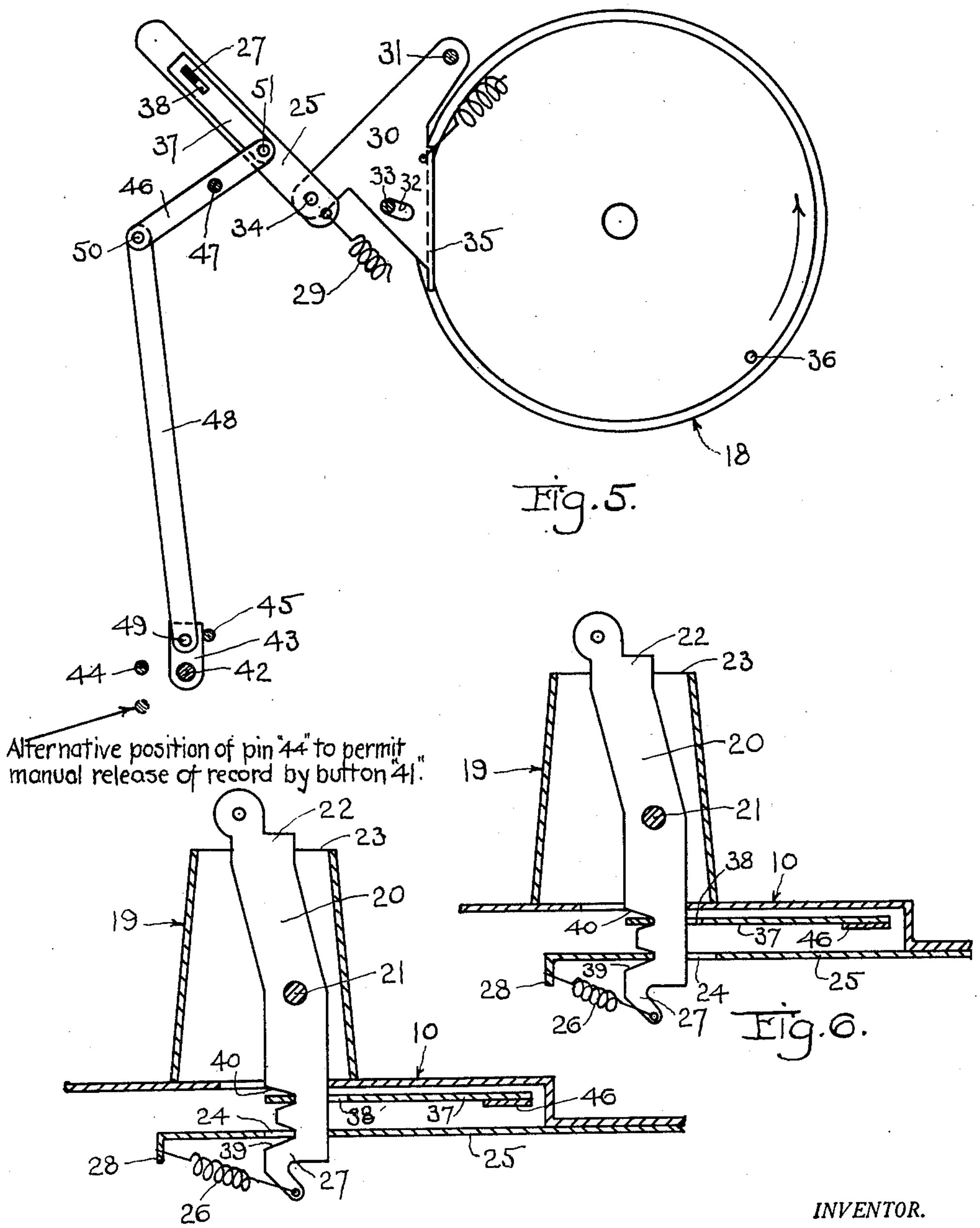
Figure 5 shows a view similar to that of Figure 2, but with the remote control button and connections shifted to their "repeat" position.
Figure 6 shows a view similar to that of Figure 3, but with the blocking bar in its blocking position.
Figure 7 shows a view similar to that of Figure 4, but with the blocking bar in its blocking position, so that the rock arm has not been rocked in this figure, notwithstanding that the reciprocable bar has been moved to its record releasing position.

Machines capable of operating on the foregoing principle are well known in this art, and it is not deemed necessary to illustrate the details of construction more fully than shown herein, for the foregoing reason. However, it is here noted that these mechanisms include means to shift the lowermost record of the unplayed group, supported by the shoulder and supported by edge support, laterally sufficiently to release such lowermost record to permit it to descend into playing position. Such means is carried by the stand 19 which is supported by the table 10 substantially in alignment with the opposite side of the center-post from the shoulder 15; and said stand also includes in some cases a support for the edge portions of the unplayed records. The means for causing such lateral shift of the lowermost record includes the arm 20, contained within the stand 19, said arm being journalled to rock on the cross pin 21 carried by the stand. Such rocking movement carries the upper end portion 22 of the rock arm towards the right as viewed in Figures 3, 4, 6 and 7; and the edge portion of the lowermost record is supported either directly by the top portion 23 of the stand or by an element which is in turn carried by the stand; but in either case the upper portion 22 of the rock arm serves to shift the edge portion of such lowermost record laterally sufficiently to disengage said record from the shoulder 15 and from the stand. In Figures 3, 6 and 7 the rock arm is shown in its normal position (that in which it is not shifting the record for disengagement); whereas in Figure 4 said rock arm is shown in its rocked position (in which it has shifted the record laterally sufficiently to cause record release).

This rock arm extends through a slot 24 provided in a slidable actuating bar 25 which is carried by the bottom of the table 10 in convenient manner. The normal position of the bar 25 is that shown in Figures 3 and 6 wherein said slot 24 engages the rock arm in such manner as to retain the rock arm in unrocked position; that is, the normal positions of these parts is that in which the left hand edge of the rock arm is engaged by the left hand extremity of the slot. A spring 26 connects the lower end 27 of the rock arm with a tail 28 on the end portion of the bar 25, so said spring always tends to retain the slide bar and rock arm in the relative positions shown in Figures 3 and 6 (and also Figure 4). Thus, by shifting the bar 25 endwise towards the left the lower end of the rock arm will follow such shift, and cause said arm to rock into the position of Figure 4 to thereby shift the lowermost record laterally for disengagement and descent. On the contrary, by merely blocking the rocking movement of the rock arm and thus preventing said rock arm from following the movement of the bar as said bar is shifted, the rock arm will remain unmoved, even when the bar is shifted, the spring 26 extending to permit of such action.

The sliding movement of the bar 25 is produced in suitable manner, but harmoniously with the cycle of movements needed during a record-changing operation. In the arrangement shown a spring 29 connected to the bar and to a suitable other part tends to draw the bar inwardly (that is, towards the right in Figures 3, 4, 6 and 7). A triangular plate 30 is pivoted to the table at the point 31, so said plate may be rocked through an angle determined by the slot 32 formed in said plate and through which slot there extends the pin 33 carried by the table. This pin and slot arrangement limits the inward movement of the slide 25 under the force of the spring 29, the triangular plate being connected to the slide by the pin 34. Said triangular plate overlies the edge portion of the one-cycle cam 18; said plate being provided with the flange 35 which reaches downwardly towards the cam; and a stud 36 carried by the cam will wipe against this flange to rock the triangular plate outwardly against the force of the spring 29 at the proper time in the cycle of movements, releasing said triangular plate for restoration to its normal position when such wiping action has been completed.

It is now seen that normally the rock arm is rocked at the proper time in the cycle of cam movements to ensure correct release of the lowermost record into playing position. I shall now show how such rocking movement may be interfered with and prevented, if desired, to thereby prevent a record release, and thus to cause the cycle to be completed without bringing a fresh record into playing position. This will ensure "repeating" operation as desired. To this end the following means have ben provided:

Reference to Figures 3, 4, 6 and 7 shows the presence of a second slide bar 37 below the table 10 and above the main slide bar 25. This second slide bar 37 is provided with the slot 38 through which the lower end portion of the rock arm 20 passes, said slot 38 being long enough to provide for normal rocking of the rock arm without interference from the second slide, when said slide stands in the position of Figures 3 and 4; in which figures the second slide bar has been moved to its normal or non-interfering position leftwards, so that the right hand end of said slot 38 comes just to the position normally occupied by the rock arm (or even to the right of such position), whereas, by moving the second slide bar 37 to the right to the position shown in Figures 6 and 7 the left hand end of said slot 38 lies against the edge of the rock arm, thus interfering with rocking moving of said rock arm from its normal position (of Figures 3, 6 and 7). In other words, this second slide bar 37 has two positions; that of Figures 3 and 4, which is a non-interfering or normal operation position, and that of Figures 6 and 7, which is an interfering or "repeat" position.

At this point, it is mentioned that the lower portion of the rock arm is preferably provided with the notches 39 and 40 into which the slide bars 25 and 37 seat, said notches serving to ensure that engagements of the slide bars with the rock arm shall always be ensured at the bottoms of said notches, thereby ensuring that such engagements shall always be at the same conditions of rocking position of the rock arm 20; and said notches also prevent any tendency of the slide bars to shift either up or down along the rock arm due to transmission of forces between said rock arm and the respective slides.

Reviewing the operations of the slides as compared to the rock arm we find the following conditions:

In Figure 3 the main or operating slide stands at its right hand limit of movement, leaving slot clearance at its right hand slot end, so that the rock arm is held by the spring 26 in its normal position; in this figure also the second or blocking slide stands in its left hand or non-interfering position, so that the slot of said second slide has its right hand end in engagement with the edge of the rock arm, and there is clearance between the left hand end of said slot 38 and the rock arm. Thus there is clearance available in the second slide to allow the rock arm to rock for record release, and the spring 26 is tending to cause such rocking of the rock arm, but such rocking is prevented by engagement of the left hand end of the slot 24 with the left hand edge of the rock arm. Leaving the second slide in this same position, but shifting the main slide 25 towards the left to the position of Figure 4 also carries the slot 24 to the left, and permits the spring 26 to draw the rock arm over into the position of Figure 4 for a record releasing operation. This is the normal operation.

Again assuming the main slide 25 to be in its right hand or initial position, but assuming the second slide 37 to be moved to the right into the position of Figure 6, it is seen that both of the slots of both slides have their left hand ends in engagement with the left hand edge of the rock arm, so that said rock arm is held by both slides against rocking under the influence of the spring 26. If now the main slide be shifted to the left to the position of Figure 7, such shifting being due to wiping of the stud 36 against the flange 35 of the triangular plate, during the one-cycle cam rotation, still such leftward shift of the main slide will not produce any rocking of the rock arm since the second slide is in such position as to prevent such rocking of said rock arm. Thus no record release will occur, and a "repeat" operation will be produced, notwithstanding the normal functioning of the main slide.

The setting of the second slide in either of its two intended positions (either for non-interference, or for interference), may be produced in any convenient manner. In the arrangement shown in the drawings I have provided a button 41 mounted on the upper end of a short shaft 42 which extends through and is journalled to the table 10 at a convenient location. Such location is shown at the front left hand corner of the table, close to the turntable. A short crank arm 43 is carried by the lower end of the shaft 42, and suitable stops 44 and 45 may be provided on the table to limit the rocking movements of this crank arm. A lever arm 46 is pivoted to the bottom of the table on the pivotal mounting 47, for rocking movement; and a link 48 connects the crank arm 43 with one end of said lever arm by means of the pin 49 at one end of said link and a pin 50 at the other end of said link. The free end of this lever arm 46 connects to the second slide 37 by means of a pin 51; and the pin connections, especially between the lever arm 46 and the second slide 37, are free enough to allow for the slight change of angularity and lengths due thereto during the slight rocking movements of the lever arm 46 in setting the same from one position to the other position.

Conveniently the button 41 may be provided with a pointer 52 which cooperates with suitable markings or indicia 53 provided on the face of the table, so that the operator will be informed as to the position to which said button has been set.

The stops 44 and 45 serve to limit the rocking movements of the crank arm 43 and the button 41. It is noted that the stop 45 may be so placed, as shown in Figures 2 and 5, that when the button 41 is moved to the "repeat" position the link 48 moves slightly past dead center as compared to the crank 43, so that no amount of force exerted endwise by the link 48 (due to tendency of the rock arm 20 to rock) can cause the crank 43 and button 41 to move away from such "repeat" position, but such movements away from the "repeat" position must be intentionally caused by intentional rotation of the button or the crank itself.

It will be noted that by rocking the button counterclockwise to carry the link 48 to a different position than that shown in Figures 1 and 2, the arm 46 will also be rocked to carry the bar 37 towards the left in Figure 3, thus tilting the rock arm 20 to the record releasing position of Figure 4. Such special movement will also entail movement of the slide 25 towards the left to the position of Figure 4 (it being noted that the spring 26 will keep the slide 25 and the lower end of the rock arm 20 in the relative positions shown in Figures 3 and 4); and such left hand movement of the slide 25 will cause yield of the spring 29. Such momentary special rocking of the rock arm 20 for a special record feeding operation will thus be effected by a backward or counterclockwise momentary rocking of the button 41 beyond the position shown in Figure 1. To enable such movement the stop stud 44 should, of course, be set low enough down in Figures 2 and 5 to permit of such special movement; but normally, and in case such special "release" movement is not desired, said stop stud 44 may be set in the position shown in Figures 2 and 5.

It is thus evident that by the disclosures herein set forth, the same button, 41, may be used either for a "repeat" operation, or for a "release" operation, or may be left in its non-operated position where it does not interfere with the normal functioning of the record-changing mechanisms.

While I have herein shown and described only a single embodiment of the features of my present invention, still I do not intend to limit myself thereto, except as I may do so in the claims to follow.

I claim:

1. In a record changing phonograph, a turntable, means for supporting a stack of records above said turntable including a stand adjacent said turntable, means for moving a record from said first mentioned means into playing position on said turntable comprising a rock arm pivotally mounted to said stand, a reciprocally movable first slide having a slot through which one end of said rock arm extends, resilient means interconnecting said one end of said rock arm and said first slide so that the force required to move a record from said first mentioned means to said turntable is transmitted from said first slide to said arm through said resilient means, means for actuating said reciprocally movable first slide during a record changing cycle to effect the transfer of a record from said first mentioned means, a second slide mounted adjacent to said first slide and having a slot therein through which said one end of said rock arm extends, the material at one boundary of said second slide slot being engageable with said one end of said rock arm for blocking movement thereof in the record releasing direction, and a plurality of notches in said rock arm one for each of said slides thereby to retain said slides against slippage along said rock arm.

2. In a record changing phonograph, a turntable, means for supporting a stack of records above said turntable including a stand adjacent said turntable, means for moving a record from said first mentioned means into playing position on said turntable comprising a rock arm pivotally mounted to said stand, a reciprocally movable first slide having a slot through which one end of said rock arm extends, resilient means interconnecting said one end of said rock arm and said first slide so that the force required to move a record from said first mentioned means to said turntable is transmitted from said first slide to said arm through said resilient means, means for actuating said reciprocally movable first slide during a record changing cycle to effect the transfer of a record from said first mentioned means, a second slide mounted adjacent to said first slide and having a slot therein through which said one end of said rock arm extends, the material at one boundary of said second slide slot being engageable with said one end of said rock arm for blocking movement thereof in the record releasing direction, and a plurality of notches in said rock arm one for each of said slides thereby to retain said slides against slippage along said rock arm, and remote control means to shift said second slide between two positions in one of which it engages said rock arm and blocks movement thereof in response to said resilient means, said remote control means comprising a rotatable element movable between two positions and a link connected between the rotatable element and said second slide.

3. In a record changing phonograph, a turntable, a center post extending upwardly from said turntable including a shoulder to support a record eccentrically on said center post above said turntable, means for shifting said record laterally to bring it into concentricity with said center post and to release said record from said shoulder so it may fall onto said turntable comprising a stand adjacent said turntable, means on the upper portion of said stand to support the peripheral edge portion of said record when said record is eccentrically mounted on said center post and supported on said shoulder, a first movable member positioned at the upper portion of said stand and movable on a radial line interconnecting said center post and said stand to effect lateral movement of said record by engaging the peripheral edge thereof to release it from said shoulder, a second reciprocally movable member disposed adjacent to said first movable member, yieldable means interconnecting said members to cause said first movable member to follow the movements of said second movable member during a record changing cycle to effect the release of said record from said shoulder, and blocking means adjacent said second member for effectively blocking the movement of said first member in response to movement of said second member, said blocking means being arranged to move parallel to said second member between a normal position and a blocking or "repeat" position and being provided with a portion extending across the path of said first member, said portion firmly engaging said first member in the "repeat" position to prevent record-releasing movement of said first member through said yieldable means, so that repeating of the record which has been played on said turntable is accomplished, wherein said blocking means comprises a reciprocable member having a slot through which the first movable member extends, the material at one boundary of said slot being engageable with the first movable member for blocking movement of said first mentioned movable member in record releasing direction.

4. In a record changing phonograph, a turntable, a center post extending upwardly from said turntable including a shoulder to support a record eccentrically on said center post above said turntable, means for shifting said record laterally to bring it into concentricity with said center post and to release said record from said shoulder so it may fall onto said turntable comprising a stand adjacent said turntable, means on the upper portion of said stand to support the peripheral edge portion of said record when said record is eccentrically mounted on said center post and supported on said shoulder, a first movable member positioned at the upper portion of said stand and movable on a radial line interconnecting said center post and said stand to effect lateral movement of said record by engaging the peripheral edge thereof to release it from said shoulder, a second reciprocally movable member disposed adjacent to said first movable member, yieldable means interconnecting said members to cause said first movable member to follow the movements of said second movable member during a record changing cycle to effect the release of said record from said shoulder, and blocking means adjacent said second member for effectively blocking the movement of said first member in response to movement of said second member, said blocking means being arranged to move parallel to said second member between a normal position and a blocking or "repeat" position and being provided with a portion extending across the path of said first member, said portion firmly engaging said first member in the "repeat" position to prevent record-releasing movement of said first member through said yieldable means, so that repeating of the record which has been played on said turntable is accomplished, wherein both said second member and said blocking means comprise slides mounted adjacent to each other and provided with slots through which the first movable member extends, together with means to move one of said slides between a normal position wherein the first movable member may move for record release, and a blocking position wherein the end of the slot of said one slide blocks following movement of the first movable member to thereby produce a "repeat" operation.

SVEN A. STOLBERG.

REFERENCES CITED

The following references are of record in the file of this patent:

UNITED STATES PATENTS

| Number | Name | Date |
|---|---|---|
| 1,938,810 | Collison et al. | Dec. 12, 1933 |

FOREIGN PATENTS

| Number | Country | Date |
|---|---|---|
| 316,852 | Great Britain | Aug. 8, 1929 |
| 399,184 | Great Britain | Sept. 25, 1933 |